(12) United States Patent
McDaid et al.

(10) Patent No.: US 9,680,919 B2
(45) Date of Patent: Jun. 13, 2017

(54) INTELLIGENT MESSAGING GRID FOR BIG DATA INGESTION AND/OR ASSOCIATED METHODS

(71) Applicant: Software AG USA Inc., Reston, VA (US)

(72) Inventors: Eddie McDaid, Hertfordshire (GB); Desmond Chan, Sunnyvale, CA (US); Manish Devgan, Herndon, VA (US)

(73) Assignee: SOFTWARE AG USA, INC., Reston, VA (US)

(*) Notice: Subject to any disclaimer, the term of this patent is extended or adjusted under 35 U.S.C. 154(b) by 82 days.

(21) Appl. No.: 14/458,773

(22) Filed: Aug. 13, 2014

(65) Prior Publication Data
US 2016/0050261 A1   Feb. 18, 2016

(51) Int. Cl.
*G06F 15/16* (2006.01)
*H04L 29/08* (2006.01)
(Continued)

(52) U.S. Cl.
CPC .......... *H04L 67/10* (2013.01); *H04L 45/302* (2013.01); *H04L 67/322* (2013.01); *G06F 9/542* (2013.01);
(Continued)

(58) Field of Classification Search
CPC ..... H04L 67/10; H04L 67/02; H04L 12/5689; H04L 45/00; H04L 2012/6443;
(Continued)

(56) References Cited

U.S. PATENT DOCUMENTS

| 5,329,619 A | 7/1994 | Pagé et al. |
| 5,812,768 A | 9/1998 | Pagé et al. |

(Continued)

FOREIGN PATENT DOCUMENTS

WO   2013/165744   11/2013

OTHER PUBLICATIONS

Sanjeev Khatiwada, University of Stavanger Faculty of Science and Technology Master's Thesis, "Architectural Issues in Real-Time Business Intelligence," Jun. 14, 2012, pp. 1-89.
(Continued)

*Primary Examiner* — Liangche A Wang
*Assistant Examiner* — Johnny Aguiar
(74) *Attorney, Agent, or Firm* — Nixon & Vanderhye PC

(57) ABSTRACT

Certain example embodiments relate to an intelligent messaging grid for Big Data ingestion and/or associated methods. Each node in a network of nodes is dynamically configurable to send and/or receive messages using one of brokered and brokerless communication models. At least some of the nodes have a complex event processing (CEP) engine deployed thereto, the CEP engines being configured to operate on messages received by the respective nodes and being classified as one of at least two different types of CEP engines. For each message received by a given node that is to be forwarded to a further node along one of multiple possible paths, the given node is configured to route the message to be forwarded to an intermediate node in one of the possible paths. The intermediate node is selected by the CEP engine of the given node based on metadata associated with the message to be forwarded.

37 Claims, 10 Drawing Sheets

(51) Int. Cl.
*H04L 12/725* (2013.01)
*H04L 12/58* (2006.01)
*H04L 12/701* (2013.01)
*H04W 40/00* (2009.01)
*G06F 11/30* (2006.01)
*H04L 12/54* (2013.01)
*G06F 9/54* (2006.01)
*H04W 40/02* (2009.01)
*H04W 72/12* (2009.01)
*H04L 12/64* (2006.01)

(52) U.S. Cl.
CPC ...... *G06F 11/3006* (2013.01); *H04L 12/5689* (2013.01); *H04L 45/00* (2013.01); *H04L 51/26* (2013.01); *H04L 2012/6443* (2013.01); *H04W 40/00* (2013.01); *H04W 40/02* (2013.01); *H04W 72/1242* (2013.01)

(58) Field of Classification Search
CPC ....... H04L 45/566; H04L 47/10; H04L 51/26; H04W 40/00; H04W 40/02; H04W 84/18; H04W 72/1242
USPC ....... 709/204, 206, 207, 217, 219, 223, 224, 709/238, 240, 241, 242, 243; 370/235, 370/351, 392, 400; 719/318
See application file for complete search history.

(56) References Cited

U.S. PATENT DOCUMENTS

| | | | |
|---|---|---|---|
| 8,024,480 B2 | 9/2011 | Distefano | |
| 8,136,122 B2 | 3/2012 | Holar et al. | |
| 8,266,351 B2 | 9/2012 | Schöning et al. | |
| 8,301,687 B2 | 10/2012 | Rokicki et al. | |
| 8,453,163 B2 | 5/2013 | Kothamasu et al. | |
| 8,640,089 B2 | 1/2014 | Bates et al. | |
| 2009/0010258 A1* | 1/2009 | Ayoub | H04W 72/10 370/392 |
| 2009/0190600 A1* | 7/2009 | Akahane | H04L 12/66 370/400 |
| 2010/0250677 A1* | 9/2010 | Kahan | H04L 12/1859 709/204 |
| 2011/0125921 A1* | 5/2011 | Karenos | H04L 45/00 709/240 |
| 2012/0082048 A1* | 4/2012 | Taft | H04L 12/1836 370/252 |
| 2012/0222005 A1 | 8/2012 | Harris et al. | |
| 2013/0046725 A1 | 2/2013 | Cammert et al. | |
| 2013/0132560 A1* | 5/2013 | Hudzia | H04L 47/283 709/224 |
| 2014/0025700 A1 | 1/2014 | Schöning | |
| 2014/0078163 A1 | 3/2014 | Cammert et al. | |
| 2014/0337474 A1* | 11/2014 | Khuti | H04L 41/5038 709/217 |
| 2015/0242253 A1* | 8/2015 | Isoyama | G06F 9/5027 719/318 |

OTHER PUBLICATIONS

Patrick Leyshock et al., "Agrios: A Hybrid Approach to Big Array Analytics," Computer Science Portland State University, retrieved Aug. 13, 2014, pp. 1-9.

* cited by examiner

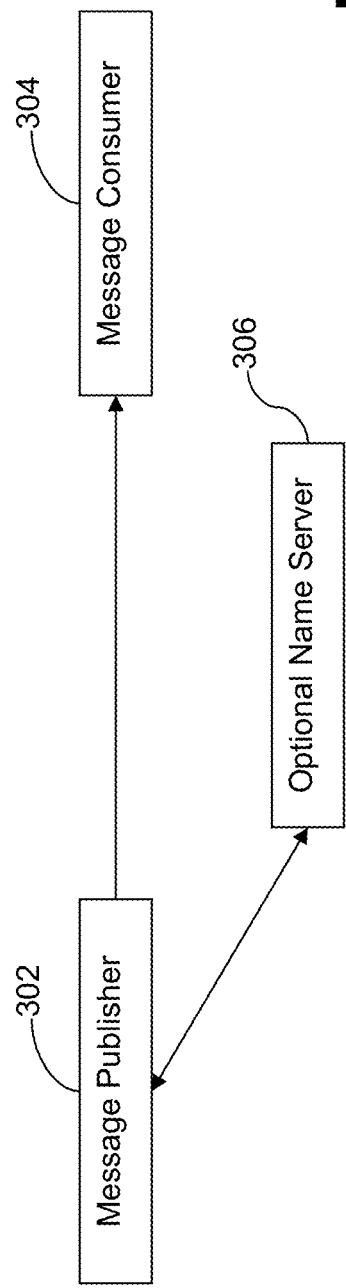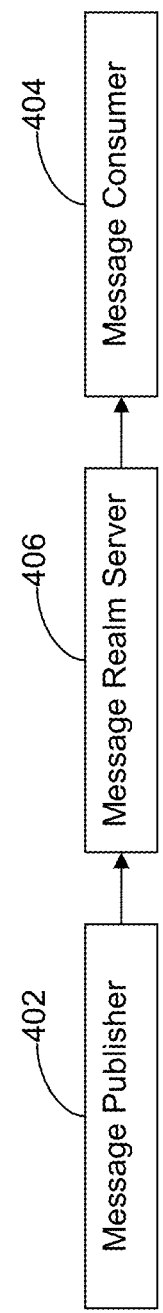
Fig. 3
Fig. 4

INTELLIGENT MESSAGING GRID FOR BIG DATA INGESTION AND/OR ASSOCIATED METHODS

TECHNICAL FIELD

Certain example embodiments described herein relate to an intelligent messaging grid for Big Data ingestion and/or associated methods. More particularly, certain example embodiments described herein relate to an intelligent messaging grid for Big Data ingestion, in which different nodes make use of different types of complex event processing (CEP) engines and are selectively configurable to communicate using either brokered or brokerless communication models. Message routing may be influenced by different factors, and switching between different protocols, processing methodologies, and/or the like, may be based on such factors, e.g., as signaled by metadata associated with the messages.

BACKGROUND AND SUMMARY OF EXAMPLE EMBODIMENTS

We live in a connected world where seemingly billions of devices are deployed and connected or interconnected for myriad different purposes. Such purposes oftentimes include a wide range of uses in industrial, residential, and/or consumer contexts. For example, on the industrial side, sensors may be deployed to wind power generators and may report on turbine operational data, e.g., with data used to perform predictive analytics relevant to maintenance-related issues. Another example that involves industrial, residential, and consumer contexts involves utility companies collecting power usage data at customer households (e.g., as is done using SmartMeters provided by PG&E), and suggesting to customers ways to save on electricity bills.

The amounts of data that may be involved could be quite large. The two examples provided above, for instance, could be said to involve "Big Data" operations, based on the tremendous amounts of data involved in each use case. In the Big Data world, data may be ingested into a data center where the analytics are performed. It will be appreciated that the volume of data could be overwhelming for one site to process, especially when some of the data need to be processed in real-time. In other words, although some data is time-sensitive and would benefit from real-time processing, other data is not so important and in essence might be allowed to "sit around" until such time as it could be handled by idle resources.

Unfortunately, many current messaging technologies address only a subset of the requirements associated with Big Data ingestion. For example, many current messaging technologies typically focus on distributing the data to some end-point(s) where the analytics power resides and thus underutilize the resources along the way. The ability to provide real-time ingestion and processing using current models can be diminished, at least compared to a situation where such processing power is not wasted. In other words, some current messaging technologies take a post-collection analytics approach. Some filtering capabilities may be provided via SQL select queries, some aggregation capabilities may be provided by combining multiple streams, and some routing capabilities may be provided according to a pre-defined rigid topology. Yet because the majority of the analytics are to be performed only after all of the data is collected, the post-collection analytics work can impose a large processing burden at the end of the process and can slow down the whole analytics effort. In a somewhat related vein, some current technologies have uniformly (in)capable nodes that offer the same messaging functionalities across the network and do not take into account the computing power available in a certain device or data center.

Some current messaging technologies also provide minimal filtering, aggregation, and routing capabilities, and are not flexible and dynamic. Indeed, there are some current technologies that are limited to ingesting data in a proprietary format. Rigid and proprietary network composition may limit implementations such that users are forced to use proprietary protocols and transports, resulting in rigid and inflexible use cases. For example, Twitter Storm is limited to Tweets collection or data ingestion into Hadoop and Apache Flume is provided only for data ingestion into Hadoop.

It would be desirable to handle large amounts of data in an efficient manner. In this regard, the inventors have recognized that it would be desirable to provide an intelligent message grid, overlaid on geographically-distributed sites, that assists in the efficient utilization of processing resources (e.g., network processing resources such as, for example, bandwidth, computing resources, etc.) in the grid as a whole. The inventors have further recognized that it would be desirable to distribute data to the right resources at the right time with an intelligent and flexible messaging layer. Some data may need to be ingested and processed very close to the origin, some may need ultra-fast processing while other data may be needed for offline historical analysis, etc. It would, for example, be advantageous to configure and use the messaging grid based on the needs of the analytics, e.g., so that data can be classified and routed accordingly. Furthermore, with a tightly integrated stream processing layer (e.g., a complex event processing (CEP) layer), such a messaging grid would be able to provide suitable analytics along the way with automated and smart switches and filtering, instead of having to depend on the analytics power at the end-point-sites.

Certain example embodiments provide for such features. For instance, certain example embodiments provide a messaging grid that:
  Supports data classification and routing according to different data characteristics;
  May be integrated with analytics engines (e.g., CEP engines) to provide analytics capabilities on each and every node/site;
  May be flexible and dynamic to adapt to changing analytics needs;
  Has lightweight nodes that can perform very efficient and fast data routing (e.g., at sub-millisecond speeds), filtering, and aggregation, as well as sophisticated nodes that can perform sophisticated data routing, distribution, filtering, aggregation, and analytics;
  Supports real-time data ingestion (e.g., with throughput at a millisecond or less speed);
  Supports multiple channels so that multiple data flows can carry on simultaneously;
  Supports geographically distributed node layouts;
  May be data format agnostic so that structured or unstructured data can be ingested;
  May be transport agnostic so that data can flow through sockets (e.g., TCP/IP), shared memory (SHM), remote direct memory access (RDMA) requests, etc;
  May be protocol agnostic so that data can be packaged under HTTP/HTTPS, SSL, Google Protobuf, etc;
  May be language agnostic so that data can be ingested by clients and/or peers that are written in different programming languages such as, for example, C/C++, .NET platform languages, Java, Python, JavaScript, etc; and/or May be messaging paradigm agnostic so that data can be sent via a distribution policy (e.g., unicast, multicast, round-robin, etc.), group policy, etc.

Stream processing typically follows the pattern of continuous queries, which may be thought of in some instances as being queries that execute for a potentially indefinite amount of time on data that is generated or changes very rapidly. Such data are called streams, and streams oftentimes comprise events. Such streams often exist in real-world scenarios, e.g., as temperature readings from sensors placed in warehouses or on trucks, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Possible events occurring in an environment typically are schematically described by so-called event types, which in some respects are somewhat comparable to table definitions in relational databases. Streams may in certain scenarios be organized in channels that in turn are implemented by an event bus. Channels and event types in this sense may be considered orthogonal concepts, e.g., in the sense that channels may comprise events of several event types, and events of the same event type might be communicated via different channels. In a CEP system, events may be evaluated and aggregated to form derived (or complex) events (e.g., by an engine or so-called event processing agents). Event processing agents can be cascaded such that, for example, the output of one event processing agent can be the input of another event processing agent. Thus, CEP may be thought of as a processing paradigm that describes the incremental, on-the-fly processing of event streams, typically in connection with continuous queries that are continuously evaluated over event streams. Moreover, CEP analysis techniques may include, for example, the ability to perform continuous queries, identify time-based relations between events by applying windowing (e.g., through XQuery), etc., with the aid of processing resources such as at least one processor and a memory. See, for example, U.S. Pat. Nos. 8,640,089 and 8,266,351, as well as U.S. Publication Nos. 2014/0078163, 2014/0025700, and 2013/0046725, the entire contents of each of which are hereby incorporated herein by reference. As indicated above, certain example embodiments make use of CEP engines and/or the like.

One aspect of certain example embodiments relates to a grid of acting components, where multiple CEP engines are provided for handling different classes of data, and where multiple messaging systems are provided for communicating among and/or between the nodes depending on the particular data involved.

Another aspect of certain example embodiments relates to the definition of a switch to route complex events to the appropriate CEP engine in a messaging system that includes multiple different CEP engines, e.g., within the message itself. The use of such a switch may be advantageous as compared to implementing a switch in a messaging realm server or broker, as the latter would be problematic for brokerless connections. Instead, in certain example embodiments, the filtering/routing may be performed inside of the CEP engine, and possible regardless of the CEP engine type.

Another aspect of certain example embodiments relates to a dynamic data classification and routing capability. For instance, in certain example embodiments, routing can occur depending on specific content of the complex event message, or it can be derived from other indirect means (e.g., address of sender/receiver, frequency of events, combination of multiple field values, etc.).

Another aspect of certain example embodiments relates to the ability to connect to and interface with one or more back-end containers (e.g., a container stored in the Hadoop Distributed File System) for persisting historical data that can be processed at a later time (such as, for example, when just-in-time processing is not required).

In certain example embodiments, a computer system comprising a plurality of computing nodes connected in a network is provided. Each said node includes processing resources including at least one processor and an interface to the network. Each said node is dynamically configurable to send and/or receive messages over the network via its respective interface using one of brokered and brokerless communication models, with at least one said node being configured to send and/or receive messages using the brokered communication model and with at least one other said node being configured to send and/or receive messages using the brokerless communication model. At least a subset of the nodes have a complex event processing (CEP) engine deployed thereto, with the CEP engines being configured to cooperate with the processing resources of the respective nodes to which they are deployed in order to operate on messages received by the respective nodes. The CEP engines are classified as one of at least two different types of CEP engines, with at least one said node having a first type of CEP engine deployed thereto and with at least one other node having a second type of CEP engine deployed thereto. For each message received by a given node that is to be forwarded to a further node along one of plural possible paths, the given node is configured to use its processing resources and interface to the network to route the message to be forwarded to an intermediate node in one of the possible paths. The intermediate node is selected by the CEP engine of the given node based on metadata associated with the message to be forwarded.

In certain example embodiments, a computing node in a network comprising a plurality of different computing nodes is provided. The computing node comprises at least one processor; an interface to the network; and a complex event processing (CEP) engine that, with the aid of the at least one processor, is configured to operate on received messages. The CEP engine is classified as one of at least two different types of CEP engines, with a first type of CEP engine having processing capabilities greater than those of a second type of CEP engine. The computing node is dynamically configurable to send and/or receive messages over the network via the interface using one of brokered and brokerless communication models. For each message received by the computing node that is to be forwarded to a further node along one of plural possible paths through the network, the computing node is configured to use its processing resources and interface to the network to route the message to be forwarded to an intermediate node in one of the possible paths. The intermediate node is selected by the CEP engine of the computing node based on metadata associated with the message to be forwarded. Routing selections made by the computing node are dynamically changeable in response to changing metadata, and routing selections are transparent to message generators on the different computing nodes in the network.

In certain example embodiments, there is provided a method of routing messages in a computer system comprising a plurality of computing nodes connected in a network. Each said node includes processing resources including at least one processor and an interface to the network. Each said node is dynamically configurable to send and/or receive messages over the network via its respective interface using one of brokered and brokerless communication models, with at least one said node being configured to send and/or receive messages using the brokered communication model and with at least one other said node being configured to send and/or receive messages using the brokerless communication model. At least a subset of the nodes have a complex event processing (CEP) engine deployed thereto, with the CEP engines being configured to cooperate with the processing resources of the respective nodes to which they are deployed in order to operate on messages received by the respective nodes. The CEP engines are classified as one of at least two different types of CEP engines, at least one said node having a first type of CEP engine deployed thereto and at least one other node having a second type of CEP engine deployed thereto. The method comprises, for each message received by a given node that is to be forwarded to a further node along one of plural possible paths, using the processing resources and the interface to the network of the given node to route the message to be forwarded to an intermediate node in one of the possible paths, with the intermediate node being selected by the CEP engine of the given node based on metadata associated with the message to be forwarded. At least some of the nodes are geographically dispersed from one another.

In certain example embodiments, there is provided a method of configuring a computer system that routes messages. The computer system comprises a plurality of computing nodes connected in a network, wherein each said node includes processing resources including at least one processor and an interface to the network. The method comprises: dynamically configuring the nodes to send and/or receive messages over the network via their respective interfaces using one of brokered and brokerless communication models, at least one said node being configured to send and/or receive messages using the brokered communication model and at least one other said node being configured to send and/or receive messages using the brokerless communication model; and deploying to at least a subset of the nodes a complex event processing (CEP) engine, the CEP engines being configured to cooperate with the processing resources of the respective nodes to which they are deployed in order to operate on messages received by the respective nodes, the CEP engines being classified as one of at least two different types of CEP engines, at least one said node having a first type of CEP engine deployed thereto and at least one other node having a second type of CEP engine deployed thereto. For each message received by a given node that is to be forwarded to a further node along one of plural possible paths, the given node is configured to use its processing resources and interface to the network to route the message to be forwarded to an intermediate node in one of the possible paths, the intermediate node being selected by the CEP engine of the given node based on metadata associated with the message to be forwarded. At least some of the nodes are geographically dispersed from one another.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 is a block diagram demonstrating how a brokerless messaging model may operate in accordance with certain example embodiments;

FIG. 4 is a block diagram demonstrating how a brokered messaging model may operate in accordance with certain example embodiments;

DETAILED DESCRIPTION OF EXAMPLE EMBODIMENTS

Figure 1:
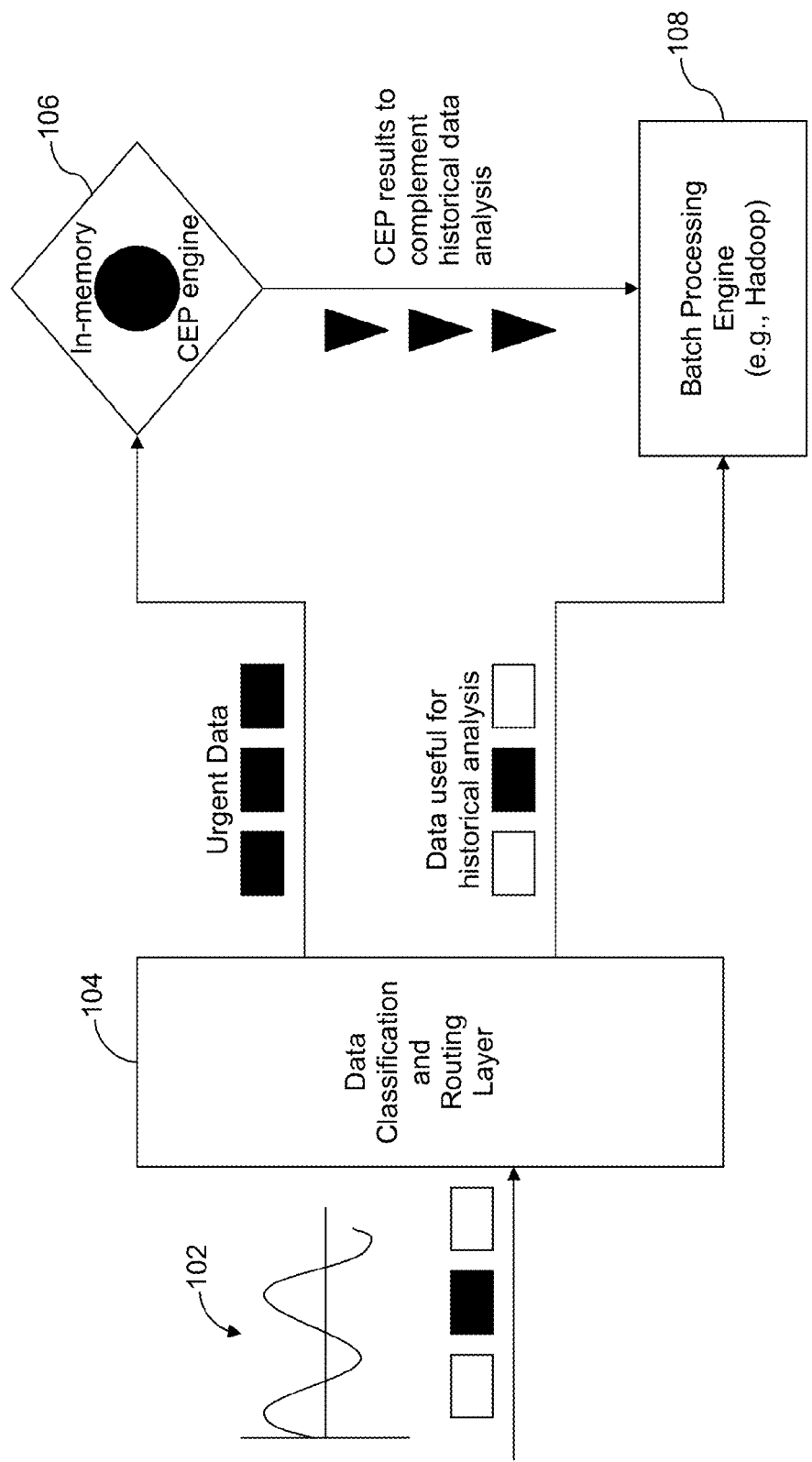
FIG. 1 is a block diagram that helps illustrate the concept of intra-site data classification and routing, which may be implemented in accordance with certain example embodiments.

One aspect of certain example embodiments relates to the use of multiple different complex event processing (CEP) systems together with an adaptable messaging system. In certain example embodiments, the different CEP engines have different focuses and capabilities, and/or the messaging system may be configured to operate in brokered and/or brokerless modes. The brokered mode of operation may be a three-tier brokered mode based on a Software AG's Universal Messaging broker, and the brokerless mode of operation may be a two-tier mode. The ability to dynamically configure nodes is advantageous in terms of being able to meet diverse requirements that may exist within a large distributed network environment typical of the sort that involve Big Data related operations. It thus is possible in certain example embodiments to provide an intelligent message grid that is capable of handling an event-driven architecture (EDA) better than any rigid single product implementation, potentially without the need for complex programming logic.

Certain example embodiments involve componentized nodes, data classification and/or routing improvements, a flexible and open network grid or system, in-place in-memory analytics, and/or the like. Each of these features will be discussed in turn in greater detail below.

First, with respect to the provision of componentized nodes, the intelligent messaging grid for Big Data ingestion of certain example embodiments may be thought of as comprising a plurality of different messaging nodes. Depending on the resources available at a certain site and the site's geographical location relative to others in the grid, the messaging nodes can have different compositions. The compositions may vary, for example, in terms of processing resources, processing power, intelligence, etc. (e.g., number and speed of processors, transitory memory, non-transitory disk space, bandwidth, communication capabilities, number and types of sensors, etc.).

In addition to basic processing resources (e.g., processors, memory, non-transitory storage, and/or the like), at least some of the nodes in the grids of certain example embodiments may be thought of as including a messaging and routing layer, and a CEP engine. In this regard, the messaging and routing layer may be either brokered or brokerless. The brokered model enables the messaging and routing layer of certain example embodiments to filter, route, and distribute messages in accordance with a complex topology. Although the existence of a broker in the architecture may provide more powerful capabilities, it will be appreciated that it may also add more overhead. It thus may be deemed more suitable for a network that can tolerate latency at the level of milliseconds to seconds. The brokerless model in certain example embodiments represents a more peer-to-peer message distribution model. It thus may support ultra-low latency (e.g., micro- to millisecond latency) and thus may be deemed more suitable for networks that require ultra-fast throughput and transaction rates.

In certain example embodiments, these two models are interoperable. That is, in certain example embodiments, a brokerless client may connect to a brokered client, and vice-versa. These operational models may be transparent to the clients and can be easily configured according to the current requirements, e.g., as explained in greater detail below. One advantage of the brokered/brokerless concept of certain example embodiments is that the models may be used interchangeably at the node level, e.g., to suit changing requirements. For example, if a processing requirement changes such that fast, low-latency behavior is desired over a robust distribution of messages with redundancy and multi-messaging paradigms, one can easily reconfigure the messaging system of certain example embodiments to the brokerless model from a brokered model without having to change the overall application layer.

Certain example embodiments are discussed in connection with two different types of CEP engines. The first type of CEP engine may be thought of as a lightweight and embedded (or at least embeddable) CEP (LE-CEP) engine. The nodes in a messaging grid might in some instance be simple sensor devices with limited resources. In such cases, it might be desirable to use an LE-CEP engine, implemented in Java or the like, at such nodes. By contrast, for sites with more powerful machines, more demanding processing requirements, etc., a powerful, standalone CEP engine (PS-CEP) might be desirable. A PS-CEP engine may, for instance, be deployed and coupled with other analytics engines such as, for example, Hadoop for batch processing and/or the like. It will be appreciated that these CEP engine descriptions are provided by way of example and that other CEP engine types in place of, or in addition to, these types, may be used in different example embodiments.

There are several messaging model/CEP engine type combinations that may be used in a grid, e.g., from a resource perspective. For instance, from a resource perspective, it might be desirable to use a brokerless messaging model with an LE-CEP engine. Such nodes may be thought of as being brokerless embedded CEP nodes. This combination advantageously offers ultra-low latency while leveraging the CEP rules engine for filtering and lightweight event processing. Another common coupling may involve brokered messaging and a PS-CEP engine. Such nodes may be thought of as being brokered standalone CEP nodes. This combination advantageously offers powerful messaging paradigms, language flexibility, and complex rules execution. It can also be coupled with other analytics engines, such as Hadoop for batch processing. Although these combinations might be typical for some grids, it will be appreciated that any suitable combination as between the messaging models and CEP engine performance types may be provided at the nodes of certain example embodiments. Indeed, certain example embodiments set forth example techniques that enable the dynamic reconfiguration of nodes such that they may take advantage of different messaging protocols, etc., at different times (e.g., as needs change).

Data classification and routing may be thought of as involving inter-site data classification and routing and/or intra-site data classification and routing. With respect to inter-site data classification and routing, the messaging nodes are configured to classify data according to its characteristics through the capabilities offered by CEP filtering, or the messaging realm server or broker. Urgent data can be processed in the brokerless embedded nodes, while the more complex yet less urgent data can be routed to the appropriate brokered standalone nodes at another site. By contrast, with intra-site data classification and routing enables, e.g., using the brokered standalone mode, certain example embodiments can be used to classify fast data for immediate processing and historical data for batch processing, all within one site.

FIG. 1 is a block diagram that helps illustrate the concept of intra-site data classification and routing, which may be implemented in accordance with certain example embodiments. The rectangular blocks in FIG. 1 represent incoming data to be routed, with the black rectangles representing urgent data and the outlined rectangles representing non-urgent data. Data streams is generated by a sensor 102 and is received at the data classification and routing layer 104. The data classification and routing layer 104 classifies the incoming data from the sensor 104 and, using a brokered messaging model, routes it to the in-memory CEP engine 106 and/or the batch processing engine 108 as appropriate. That is, all urgent data is routed to the in-memory CEP engine 106, whereas any data useful for historical analysis (e.g., data that can be processed in batch in non-real-time) is routed to the batch processing engine 108 regardless of whether it is urgent or non-urgent data. As shown in FIG. 1, results from the in-memory CEP engine 106 may be sent to the batch processing engine 108 for analysis purposes, as well.

With respect to the provision of a flexible and open network grid, as alluded to above, the messaging layer of certain example embodiments may be agnostic as to the implemented language, protocol, transport, and/or the like. When it comes to language, certain example embodiments enable users to use C/C++, .NET platform languages, Java, Python, Excel VBA, JavaScript, Adobe Flex, MS Silverlight, iPhone (iOS) and Android related development environments, etc. When it comes to communication protocol, certain example embodiments enable users to use HTTP, HTTPS, SSL, Sockets (TCP/IP), etc. When it comes to transport mechanism, certain example embodiments enable users to use shared memory (SHM), remote direct memory access (RDMA), TCP/IP calls, etc. The flexibility in this regard advantageously enables to the messaging layer to be deployed anywhere from mobile devices to turbines, from smart meters to large data centers, etc., making the data able to traverse and be processed by various computers of different powers for various analytics needs.

Figure 2:
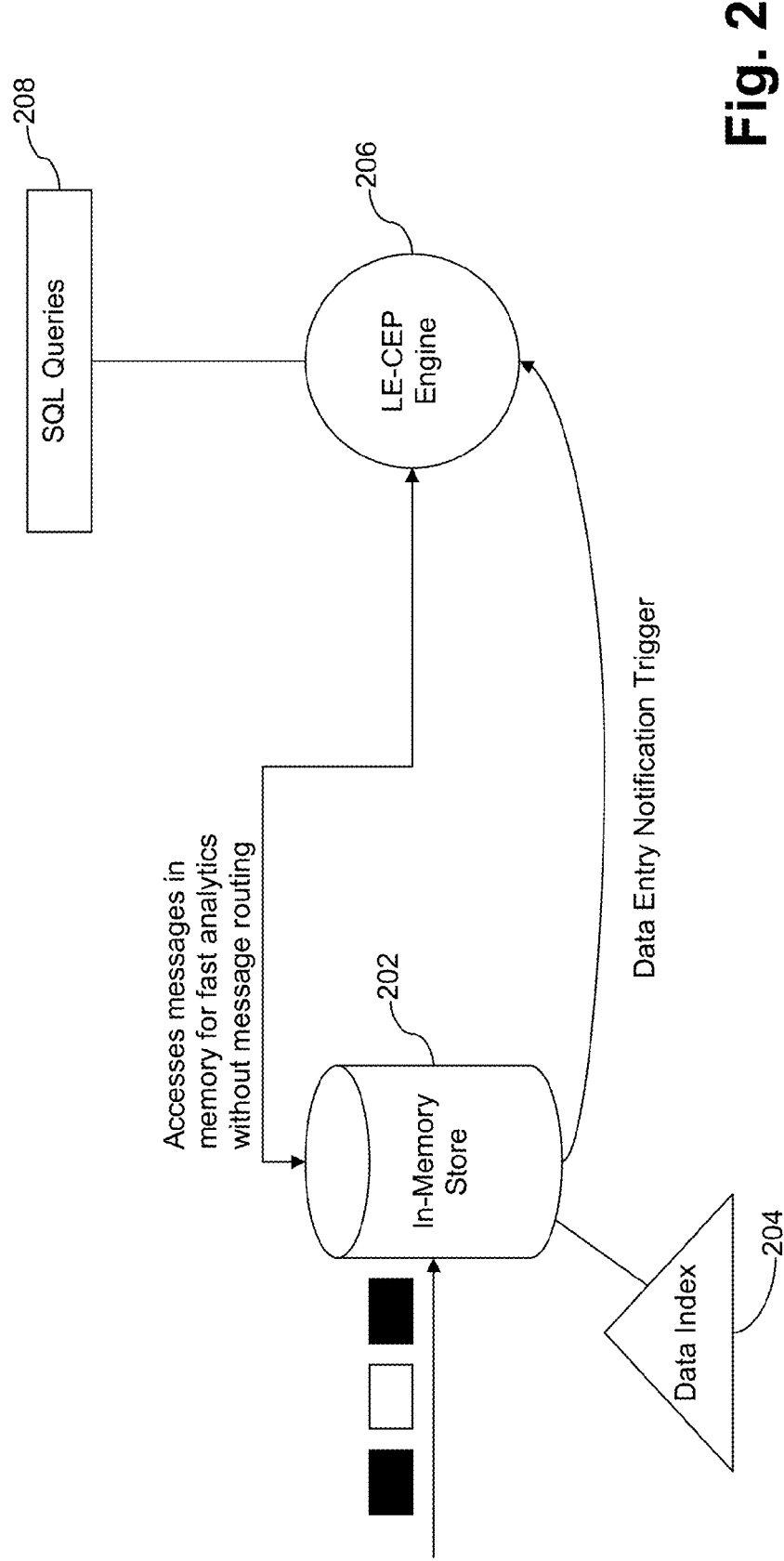
FIG. 2 is a block diagram that helps illustrate the in-place in-memory analytics capabilities of certain example embodiments.

FIG. 2 is a block diagram that helps illustrate the in-place in-memory analytics capabilities of certain example embodiments. In brokerless embedded nodes, for example, messages can be sourced from an in-memory module 202. That is, incoming data (again represented schematically using solid or outlined rectangles as described above in connection with FIG. 1) is stored to the in-memory module 202, and such data may be indexed using the data index 204. The in-memory module 202 raises a notification to the LE-CEP engine 206 when a message arrives. The LE-CEP engine 206 can then use its rules engine (e.g., that execute SQL queries 208 or the like) to process the message directly. For instance, the LE-CEP engine 206 can use the brokerless messaging layer to distribute the processed messages to other parts of the grid for further processing, as appropriate.

This approach advantageously leverages the computing power available in the immediate nodes. In other words, the LE-CEP engine 206 locally accesses messages in memory for fast analytics without message routing. Thus, by the time the data arrives at its final destination, at least some (and possible most or even all) of the analytics may be performed. Thus, the destination node can use the pre-processed data for other analytical purposes such as, for example, storing it using Hadoop for some other analytics desired by the user.

A description of the brokerless and brokered messaging models will now be provided. As alluded to above, the brokerless messaging model of certain example embodiments refers to a peer-to-peer deployment model that does not include a messaging realm server or broker. FIG. 3 is a block diagram demonstrating how a brokerless messaging model may operate in accordance with certain example embodiments. Two messaging clients connect to one another to perform ultra-fast data transmission, potentially without an intermediary hub and the associated overhead. That is, a message publisher 302 sends a message to a message consumer 304, potentially with the aid of an optional name server 306. As can be seen from the FIG. 3 example, no intermediary devices are provided between the message publisher 302 and the message consumer 30. Although one message publisher and one message consumer are shown in the FIG. 3 example, it will be appreciated that any cardinality of publishers and consumers may be provided, depending on the implementation and may function, for example, in a peer-to-peer manner.

The latency in this deployment model is typically in millisecond or sub-millisecond range, and this approach may be used, for example, when users desire an ultra-fast messaging model. The ultra-fast messaging model may be particularly useful for networks that need to sustain ultra-fast transaction rates. For example, real-time auction sites, trading sites, and/or the like, may use the brokerless messaging model to achieve ultra-low latency and meet associated requirements.

It will be appreciated that the brokerless messaging model may be used to send and receive messages from other devices implementing the same or different brokerless messaging models, as well as other devices implemented brokered messaging models. Users can easily replace one model with another with simple configuration changes, e.g., as shown in detail below.

Example brokered messaging techniques are described in, for example, U.S. Pat. Nos. 8,453,163; 8,301,687; 8,136,122; 5,812,768; and 5,329,619, the entire contents of each of which are hereby incorporated herein by reference. FIG. 4 is a block diagram demonstrating how a brokered messaging model may operate in accordance with certain example embodiments. As alluded to above, the brokered messaging model in certain example embodiments refers to a client-server deployment model where the data is first sent from a message publisher 402 to a message consumer 404 via a message realm server or broker 406. In other words, the message realm server or broker 406 distributes the data according to the underlying messaging paradigm, which may be the publish/subscribe model or a variant thereof. Clients can publish and subscribe via the messaging paradigms. Different messaging paradigms affect the distribution patterns, and the users choose the messaging paradigms according to the routing needs or desires. The brokered messaging model typically results in latency in seconds or sub-seconds.

Unlike brokerless messaging, a brokered messaging model may provide for data aggregation. For instance, a realm server or broker may be configured to aggregate messages using a technique called conflation or the like. Conflation may be useful, for example, in the merging and throttling of events. Multiple messages may be condensed into one, either through dropping or merging. In case of dropping, the last message in the channel is retained for transmission. This may be done in a throttled delivery in which, for example, the message deliveries are throttled at 1 second intervals. In merging, the latest updates of each field in a message may be merged into one snapshot message.

A brokered messaging model additionally or alternatively allow for different messaging paradigms to be used. For instance, delivery may be made using topics, queues, datagroups, and/or the like. Topics are a logical rendezvous point for publishers (producers) and subscribers (consumers) or data (events). A publish/subscribe (or pub/sub) model is used for a topic. In a topic, all events will be delivered to each subscriber once and only once. Queues are variants of topics. In a queue, the events are delivered to only one subscriber, e.g., in a round-robin fashion. For example if there are three subscribers and three messages A, B, and C, A will be delivered to the first subscriber, B to the second, and C to the third. Datagroups provide an alternative to topics for publish/subscribe.

Datagroups are essentially groups of consumers to which publishers can send events; more specifically, datagroup members are either individual consumers or other (nested) datagroups. Messages published to a datagroup will be sent to all members of the group. There can be multiple publishers associated with a single datagroup, and datagroup membership can be managed by a message realm client that has permissions to do so. Datagroups are designed to support large numbers of consumers whose subscriptions are typically fluid in nature. The addition or removal of consumers from datagroups can be transparent from the consumer perspective.

Both LE-CEP engines and PS-CEP engines are capable of processing events in real-time. One difference between such engines relates to their relative capacities. An LE-CEP engine may be implemented in Java and will be easily embeddable in applications and/or on devices, whereas a PS-CEP engine may be more powerful and deemed as a standalone technology. The following table provides a comparison between certain example implementations of LE-CEP and PS-CEP engines.

|  | Example LE-CEP Engine | Example PS-CEP Engine |
| --- | --- | --- |
| Event Processing Speed | Real-time | Real-time |
| Workload Sustainability | Light-to-medium | Heavy |
| CEP Rules | SQL-like | EPL + SQL-like |
| Implementation Language | Java | C/C++ with JVM compatibility |

In the intelligent messaging grid of certain example embodiments, an LE-CEP engine may be desirable for lightweight event processing such as, for example, event filtering in an embedded model. A PS-CEP engine, on the other hand, may be desirable for standalone deployment and more complex rule executions. The Event Processing Language (EPL), which is a procedural language, may be used for more complex implementations of logic and structural execution.

Figure 5:
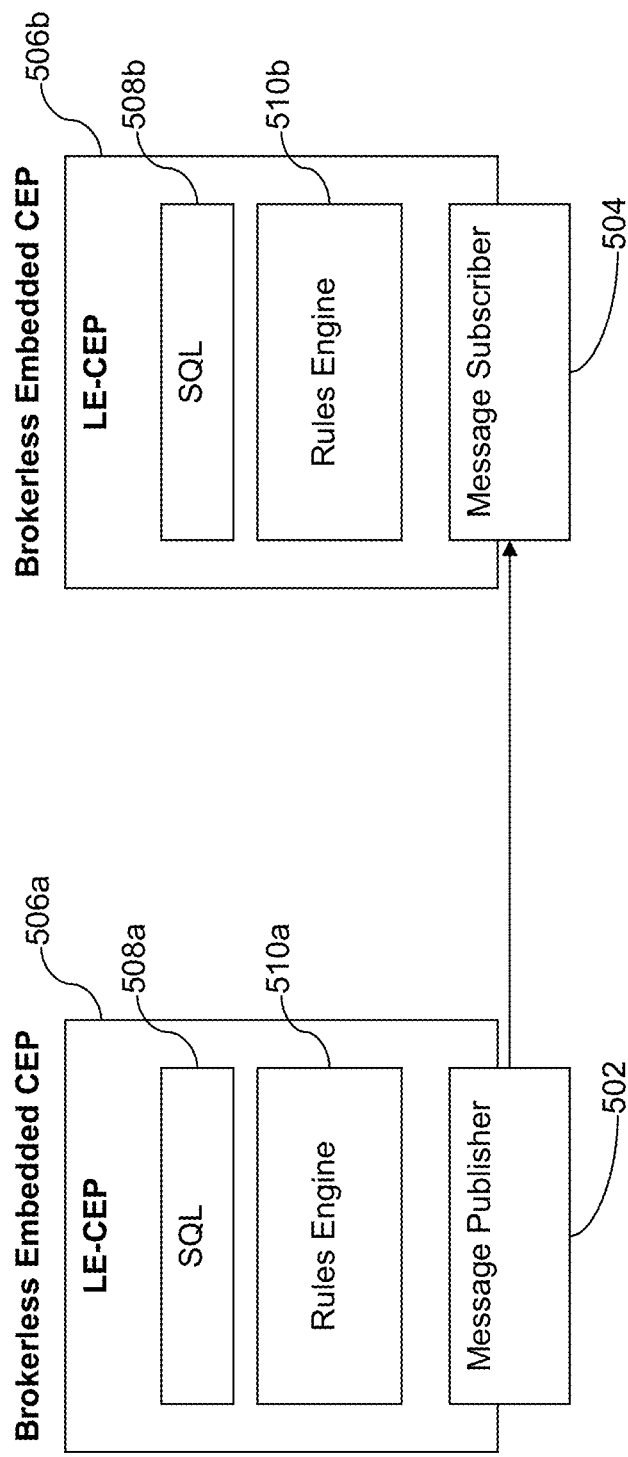
FIG. 5 is a block diagram illustrating a first brokerless embedded CEP node communicating with a second brokerless embedded CEP node in accordance with an example embodiment.
Figure 6:
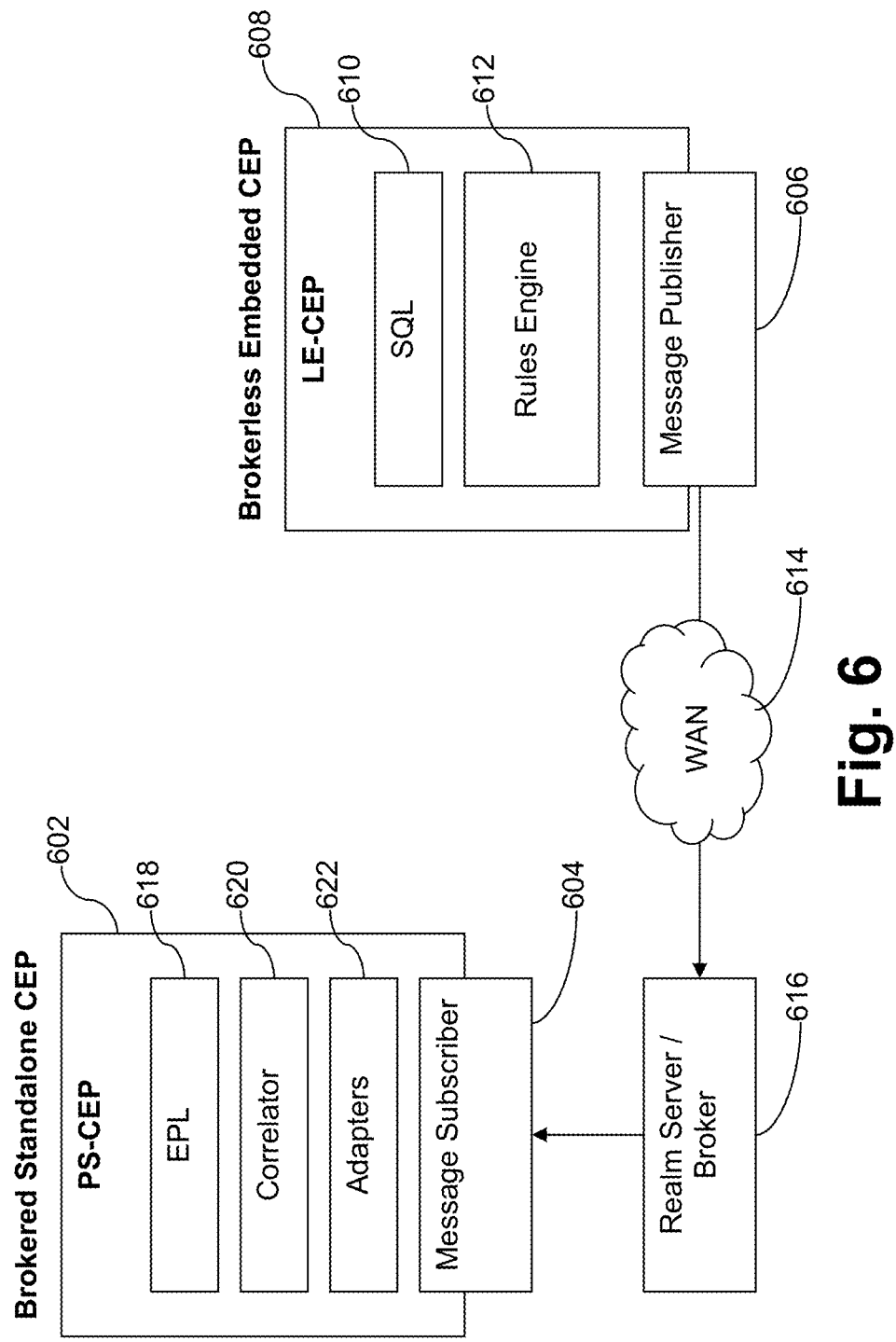
FIG. 6 is a block diagram illustrating a brokered stand-alone node communicating with a brokerless embedded CEP node in accordance with an example embodiment.

FIGS. 5 and 6 help illustrate example architectures of messaging nodes. More particularly, FIG. 5 is a block diagram illustrating a first brokerless embedded CEP node communicating with a second brokerless embedded CEP node in accordance with an example embodiment, and FIG. 6 is a block diagram illustrating a brokered standalone node communicating with a brokerless embedded CEP node in accordance with an example embodiment.

Devices with various processing capacities may exist on a given messaging grid. Those devices with less computing and/or networking capacities can take advantage of an embedded lightweight model that is brokerless and is deployed along with the LE-CEP engine. An LE-CEP engine may provide for fast filtering of data via standard SQL queries or the like, and fast routing of data from the message publisher to the Message Subscriber, e.g., without overhead "in the middle." In this regard, the message publisher 502 communicates with the message subscriber 504, and they respectively include first and second LE-CEP engines 506a-506b. The first and second LE-CEP engines 506a-506b can filter and route messages using predefined SQL queries stored to first and second SQL query stores 508a-508b and in connection with the respective first and second rules engines 510a-510b. As will be appreciated from the discussion below, one or both of the first and second LE-CEP engines 506a-506b may be provided to turbines in the example set forth below.

Datacenters may include more computing and/or networking power, e.g., as compared to end devices, and thus may have brokered standalone CEP model capabilities. In FIG. 6, the PS-CEP engine 602 is deployed to the message subscriber 604, which may be a datacenter that receives data from the more simplistic message publisher 606 (which implements an LE-CEP engine 608 and includes a SQL query store 610 and a rules engine 612 as described above) via a wide area network (WAN) 614 and realm server or broker 616. The PS-CEP engine 602 supports flexible messaging paradigms according to the data distribution needs and/or desires and is configured to provide analytics in connection with EPL-based queries 618 for filtering, aggregation, event correlation, etc. An event correlator 620 may be provided to assist with the latter. Adapters 622 may support different messaging paradigms, e.g., in the event that there are multiple brokers, direct peer-to-peer connections, and/or the like. As will be appreciated from the discussion below, the LE-CEP engine may be deployed to a turbine, and the PS CEP engine may be deployed to a national data center or the like.

Example Use Case and Implementation

An example use case and implementation will now be provided in connection with an intelligent messaging grid that helps monitor myriad turbines deployed for energy generation. In this example use case, sensors are planted alongside the turbines to detect turbine malfunctions and to enable reactive and proactive measures to be implemented. Reactive measures in this sense refer to immediate reactions taken in response to turbines that have failed, and proactive measures in this sense refer to maintenance actions taken in response to analytics performed on turbine operational data (e.g., analytics indicating how well the turbines are performing, the state of "wear-and-tear" of the turbines, etc.).

Figure 7:
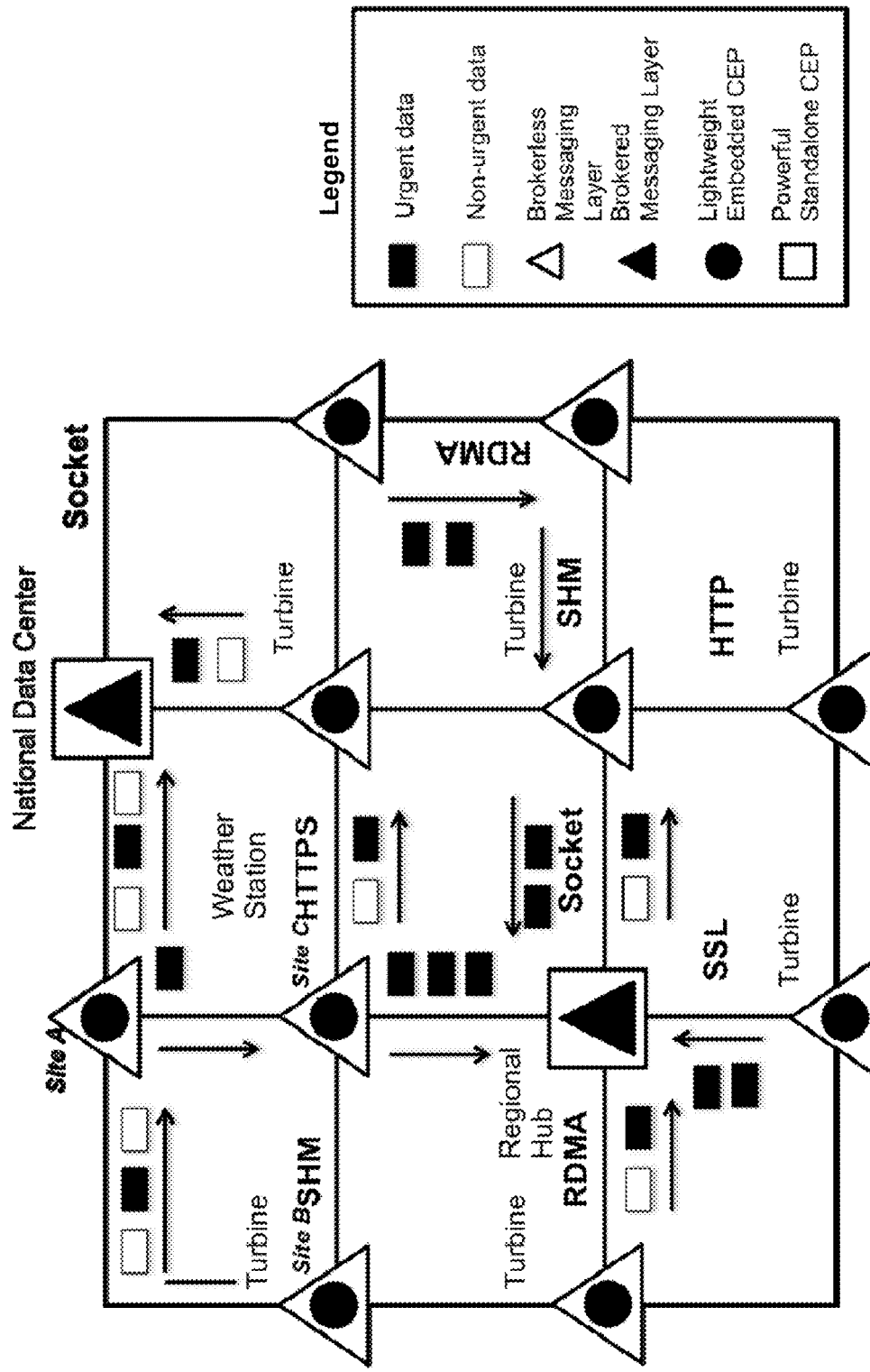
FIG. 7 is an intelligent messaging grid for ingesting turbine operational data in accordance with an example embodiment.

FIG. 7 is an intelligent messaging grid for ingesting turbine operational data in accordance with an example embodiment. In the FIG. 7 example, each intersection in the grid is a site that includes turbines and/or data processing nodes. LE-CEP engines are deployed with the turbines, and more sophisticated nodes are deployed with the larger data centers or the like. It will be appreciated that a given site can include a cluster of nodes, for example, to provide for additional computing and/or networking power.

In the FIG. 7 example, there are two large data centers where the most sophisticated nodes are deployed, namely, the regional hub and the national data center. Assume for the purposes of this example that the regional hub is where the repair force is dispatched from, and that the staff at the regional hub thus are only interested in data that indicates that immediate repair needs. Assume further for the purposes of this example that the national data center is where the predictive analytics are performed, and that the staff here are interested in data that is useful for determining which turbines are in need of maintenance or replacement in the near future (e.g., within 3 to 6 months). With predictive analytics, the turbine operations management can better prepare for future maintenance needs, e.g., staffing, budgeting, and/or other predicted needs.

Inter-site data routing in the FIG. 7 example may be performed in connection with the brokerless embedded CEP model. Each of the brokerless LE-CEP nodes deployed alongside the turbines forwards its sensor data to the adjacent site(s) en route to both the regional hub and the national data center. These intermediary sites may decide to route different data to different adjacent sites, e.g., via intelligent filtering criteria that takes into account factors such as, for example, the data's nature (e.g., relative importance, urgency, type, etc.), size, etc.; processing resources locally and/or at adjacent node(s); actual and/or expected network congestion; and/or the like. For instance, sites with more computing power may be eligible for processing some data that needs more immediate attention. In this case, the data may be retained and processed locally. Other data that requires more data processing resources (e.g., increased processing power, memory, and/or the like, e.g., for performing more computationally intensive algorithms) may be forwarded to a more powerful site.

Switching based on the nature of the data can be implemented in a number of different ways. For instance, certain example embodiments may ensure that each message coming from a turbine carries metadata. Data priority can be encoded in the metadata as appropriate. For instance, metadata tags may specify a relative priority based on a numerical score (e.g., priorities 1-3, 1-10, etc.) or the like. One example in this regard is that relative priorities can be assigned to data for which immediate attention is needed, data that is urgent operation data, and data that is needed for historical analysis purposes.

Switching alternatively or in addition can occur based on a data priority field set in the metadata of each of the messages. For example, Site A in FIG. 7 may choose to switch based on data priority and forward (a) only data for which immediate attention is needed to Site C en route to the regional hub, and (b) all data to national data center. This switching may be accomplished using a select statement in the LE-CEP engine instead of relying on messaging layer. The following pseudo-code provides examples of how this functionality could be implemented:

```
ResultSet rs := SQLStmt.CreateStmt("select * from data_stream where metadata.data_priority = 'immediate attention needed'").Execute( );
rs.forward(SiteC);
rs:= SQLStmt.CreateStmt("select * from data_stream").Execute( );
rs.forward(NationalDC);
```

Figure 8:
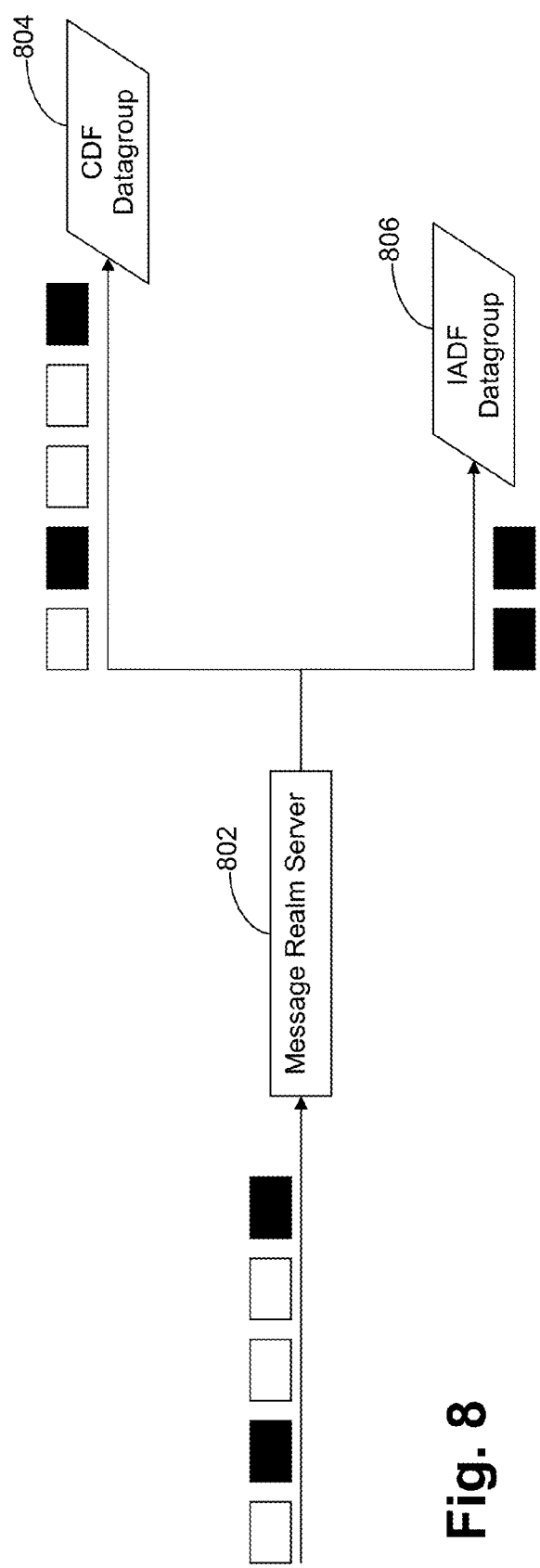
FIG. 8 illustrates how the realm server or broker forwards the data according to the data's nature to two established datagroups in certain example embodiments.

In the brokered standalone CEP model, realm servers or brokers are used for routing messages. FIG. 8 illustrates how the realm server or broker forwards the data according to the data's nature to two established datagroups in certain example embodiments. The datagroups in the FIG. 8 example include a first datagroup that subscribes to a Comprehensive Data Feed (CDF) and a second datagroup that subscribes to an Immediate Attention Data Feed (IADF). It will be appreciated that although only two datagroups are shown, further datagroups can be established, e.g., if there are more complex routing needs. As with the drawings described above, the black rectangles representing urgent data and the outlined rectangles representing non-urgent data.

As can be seen from FIG. 8, the realm server or broker 802 forwards all data to the CDF datagroup 804, whereas the realm server or broker 802 only the urgent data to the IADF datagroup 806. In other words, the CDF datagroup 804 is less discriminating than the IADF datagroup 806, and all data will travel to the former. The IADF datagroup 806 will only accept the data that indicates that immediate attention is needed. The data that belong to the CDF datagroup 804 may be forwarded over the WAN to another realm server for further dispatching, e.g., as shown in and described in connection with FIG. 9.

Figure 9:
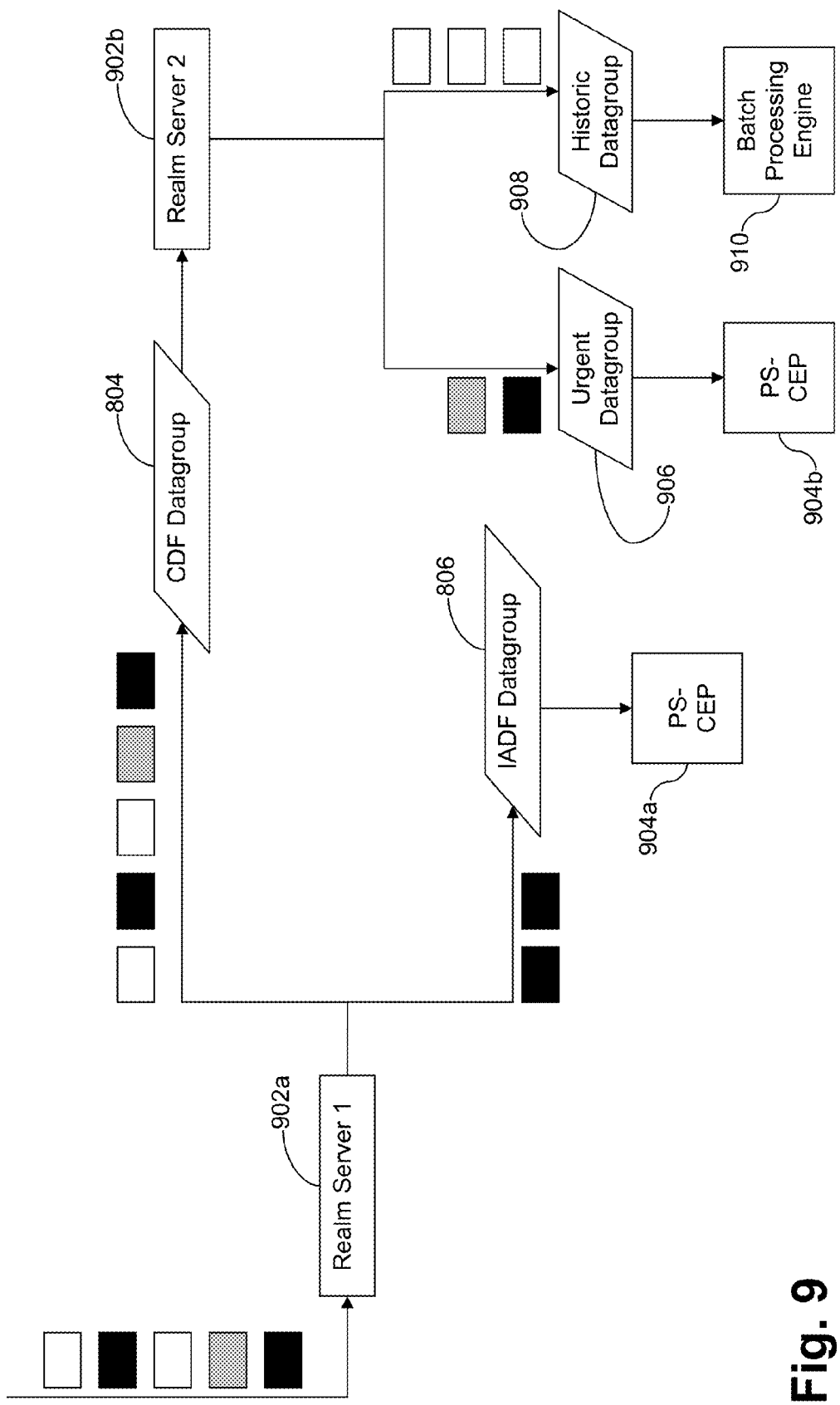
FIG. 9 illustrates how realm servers or brokers can be used for both inter- and intra-site routing when appropriate configured, e.g., in connection with certain example embodiments.

FIG. 9 illustrates how realm servers or brokers can be used for both inter- and intra-site routing when appropriate configured, e.g., in connection with certain example embodiments. For example, a first realm server 902a can send messages to a second realm server 902b over the WAN, and the messages can be further dispatched once they reach this second realm server 902b using the same or different routing switches. The FIG. 9 example assumes the presence of data marked as needing immediate attention (black rectangles), as being urgent (grey rectangles), and as being historical in nature (white rectangles). The first realm server 902a routes the data marked as needing immediate attention to the IADF datagroup 806, where it is processed by a first PS-CEP engine 904a, which may be collocated with the first realm server 902a. All of the data is routed to the second realm server 902b, as the second realm server 902b is a member of the CDF datagroup 804.

The second realm server 902b is remote from the first realm server 902a and dispatches the urgent data to the urgent datagroup 906 for a second PS-CEP engine 904b to process. Historical data is sent to a batch processing engine 910 member of the historic datagroup 908. For instance, historical data may be processed by Hadoop for storage, and it may be later batch processed (e.g., in connection with MapReduce jobs).

Like the brokerless model, the datagroups can be set up dynamically, e.g., in response to calls from an application programming interface (API) or the like, a changed configuration file (e.g., altered as a result of a change made by a user interface), etc. Thus, routing can be changed in real-time, e.g., according to criteria such as site availability, loads, etc. In this latter regard, the configuration may be specified programmatically, e.g., to switch between brokered and brokerless messaging if processing loads become too high, if network congestion increases, etc. Such configurational details may be provided using sequences of program logic stored to a non-transitory computer readable storage medium accessible by (e.g., potentially on) the nodes themselves, etc.

In certain example embodiments, conflation can be enabled on datagroups, e.g., to help further increase the performance of messaging. A datagroup with conflation enabled can throttle and merge messages according to user-specified configuration details. For instance, the regional hub may be capable of processing messages from each associated turbine at 1 second intervals. The user thus may set up the conflation policy to throttle the delivery at 1 second intervals and to only retain the latest message (thereby dropping all previous messages). This way the regional hub can effectively handle the load from all the turbines in its region.

Figure 10:
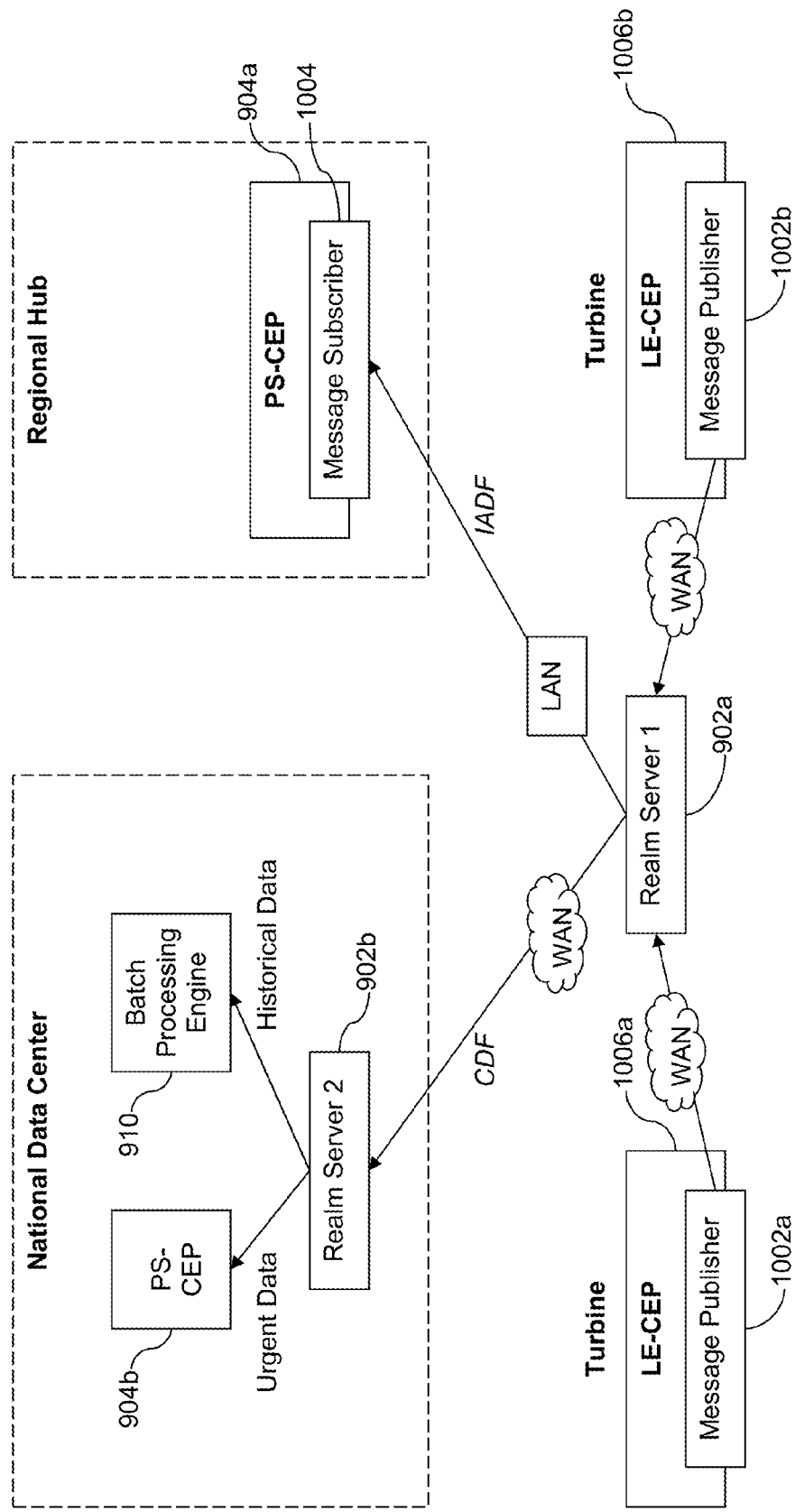
FIG. 10 is another view of the data flow of the intelligent messaging grid in accordance with the detail shown in the FIG. 9 example.

FIG. 10 is another view of the data flow of the intelligent messaging grid in accordance with the detail shown in the FIG. 9 example. As illustrated in the national data center in FIG. 10, its local realm server 902b, after receiving the comprehensive data feed (which is based on messages generated by the first and second message publishers 1002a-1002b at the turbines), further routes the urgent data (e.g., data that can be used for real-time analysis) to the PS-CEP engine 904b, and the historical data to the batch processing engine 910. By contrast, the immediate attention data feed is sent to the message subscriber 1004 at the regional hub, which includes its own PS-CEP engine 904a. It will be appreciated that both the national data center and the regional hub include brokered standalone CEP engines, whereas the first and second turbines include lightweight embedded brokerless CEP engines, shown as first and second LE-CEP engines 1006a-1006b.

In the FIG. 7 example intelligent messaging grid, various transport layers are employed on different links. These include SHM, RDMA, TCP/IP transport mechanisms. Various communication protocols also are used, including HTTPS, HTTP, Google Protocol Buffer, and SSL. Because of the flexible nature of the messaging grid when it comes to transport and protocol, certain example embodiments can incorporate a wide range of networking components and can accommodate a wide range programming languages, thereby promoting flexibility in the overall system.

Figure 11:
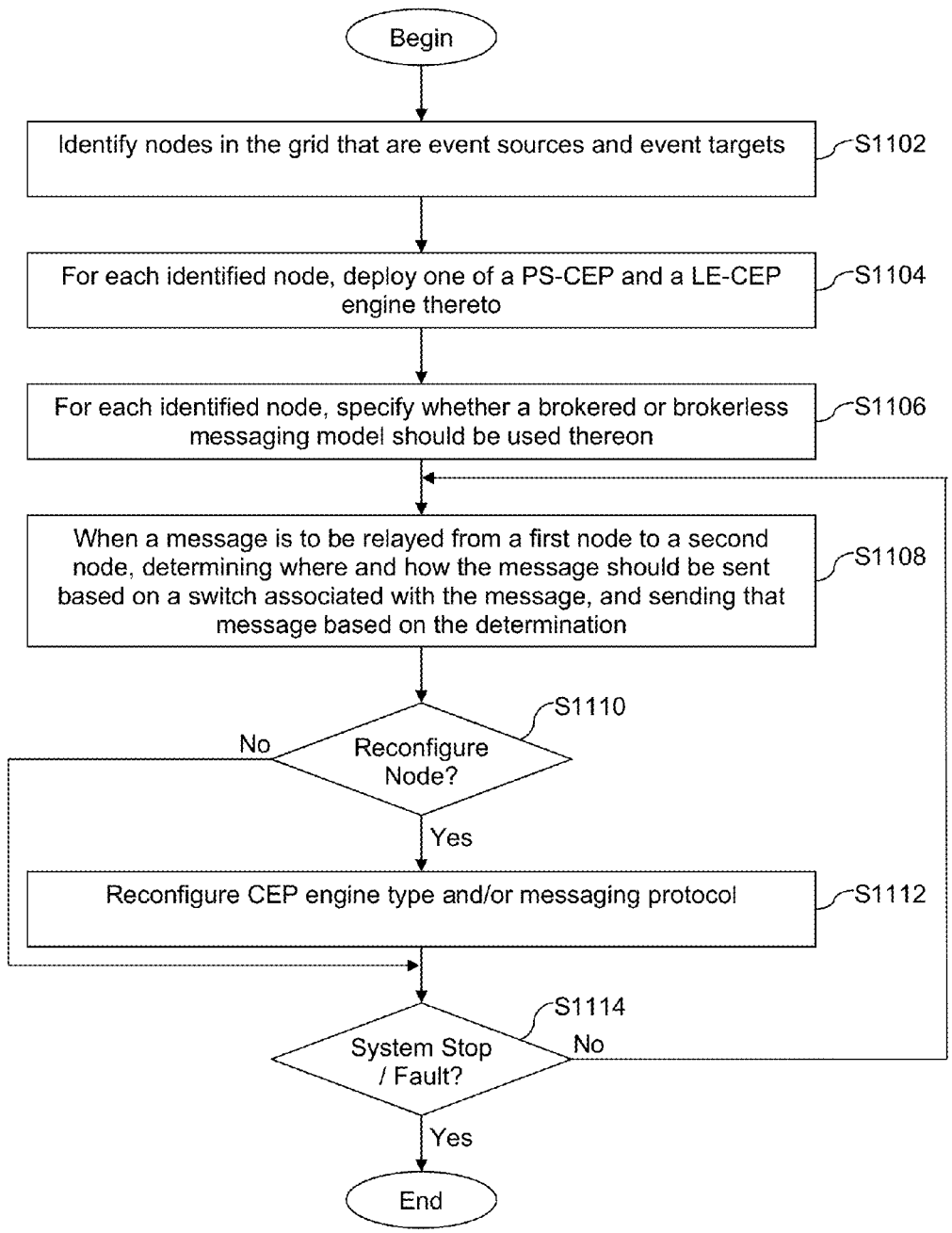
FIG. 11 is a flowchart illustrating techniques associated with certain example embodiments.

FIG. 11 is a flowchart illustrating techniques associated with certain example embodiments. In step S1102, nodes in the grid that are event sources and event targets are identified. For each identified node, one of a PS-CEP and a LE-CEP engine is deployed thereto in step S1104, and a specification as to whether a brokered or brokerless messaging model should be used thereon is made in step S1106. Further publish/subscribe details may be specified for brokered messaging. Such further information may include, for example, what queues, topics, or datagroups a publisher should publish to, which a subscriber subscribes to, the particular delivery mechanism to be used (e.g., round robin, exactly one, etc.), and/or the like. When a message is to be relayed from a first node to a second node, a determination as to where and how the message should be sent is made based on a switch associated with the message (e.g., metadata embedded in or otherwise associated with the message), and that message is sent based on the determination, in step S1108. A determination is made in step S1110 as to whether a given node should be reconfigured. This determination may be based on, for example, user input; a periodic assessment of relative workloads, processing resource availability, actual or expected network congestion, etc.; an alert that some of the aforementioned and/or other conditions are approaching dangerous levels, that a node has gone done or otherwise become unavailable, etc.; and/or the like. Reconfiguration, if needed or desired, occurs in step S1112, and this may involve reconfiguration of CEP engine type, messaging protocol, messaging protocol parameters, routing rules, etc. The system may continue operating in this way, e.g., unless a system stop, fault, or other event is detected in step S1114.

As will be appreciated from the above, certain example embodiments provide for an intelligent messaging grid for Big Data ingestion that enables sophisticated messaging capabilities for classifying, routing, and distributing data to different nodes for processing. The messaging grid of certain example embodiments further provides for flexible, modularized messaging and processing layers, thereby helping to accommodate potentially different processing resources on different machines or devices at different sites. Messaging and processing layers in certain example embodiments comprise: brokered or brokerless messaging models, and lightweight embedded or powerful standalone CEP engines.

The messaging components of certain example embodiments can be combined with the CEP components in various configurations, e.g., to allow for efficient Big Data ingestion, improved utilization of resources, suitable applications of analytics, adherence to service level agreements (SLAs) for analytics results etc., and/or the like. Certain example embodiments further provide some or all of the following and/or other features: componentized nodes with compositions that suit the analytics purposes and on-site computing resources (e.g., via the seamless dynamically re-configurable use of LE-CEP and PS-CEP engines, and brokered and brokerless messaging models);data classification, and inter- and intra-site routing through the use of unique messaging paradigms offered by realm servers or brokers and filtering (e.g., through the use of control codes, switches, program logic and/or the like, such as routing rules that are based on data type and use case);a flexible and open network grid with a messaging layer that is agnostic as to language, protocol, transport, and/or the like; and in-place, in-memory analytics to process data in immediate nodes if appropriate and reduce the load at the final destination (e.g., using rules for data classification and routing on top of existing CEP and a scalable in-memory data management tool such as Software AG's Terracotta BigMemory). Certain example embodiments thus take into account the potentially disparate configurations, non-uniform and potentially changing processing needs and/or conditions, etc., that may be present, and provide a flexible "one-size-fits-all" solution for Big Data Ingestion.

Although certain example embodiments are discussed in connection with certain programming languages, protocols, transport mechanisms, and/or the like, it will be appreciated that any suitable combination, sub-combination, or combination of sub-combinations of the above-identified and/or other aspects may be used, as appropriate and/or desired. Similarly, although certain example broker implementations are identified, it will be appreciated that other broker implementations may be used in place of or in addition to those described herein.

Although certain example embodiments have been described in connection with Hadoop, including Hadoop's implementation of MapReduce, the HDFS, etc., it will be appreciated that the example techniques disclosed herein may be used in connection with other frameworks, MapReduce algorithm implementations, distributed file systems, and/or the like. It will be appreciated that the direct memory access protocols may be implemented in connection with an in-memory data grid (IMDG) and/or the like. As will be appreciated, an IMDG may refer to an arrangement in which all servers can be active in each site, all data is stored in the RAM of the servers, servers can be added or removed non-disruptively (e.g., to increase the amount of RAM available), the data model is non-relational and is object-based, distributed applications (e.g., written on the .NET and Java application platforms) are supported, and the data fabric is resilient (e.g., allowing non-disruptive automated detection and recovery of a single server or multiple servers). Of course, additional and/or alternative IMDG functionality may be provided in certain example embodiments. Software AG's Terracotta Big Memory product also may be used in this regard. See, for example, U.S. Publication No. 2012/0222005, the entire contents of which are hereby incorporated herein by reference.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system comprising a plurality of computing nodes connected in a network, wherein:
 each said node of the plurality of computing nodes includes processing resources including at least one processor and an interface to the network;
 each said node of the plurality of computing nodes is dynamically configurable to use one of a brokered communication model and a brokerless communication model to send and/or receive messages over the network via the respective interface to the network, at least one node of the plurality of computing nodes being configured to send and/or receive messages using the brokered communication model and at least one other node of the plurality of computing nodes being configured to send and/or receive messages using the brokerless communication model;
 each node of at least a subset of nodes of the plurality of computing nodes including a complex event processing (CEP) engine deployed thereto, the CEP engines being configured to cooperate with the processing resources of the respective nodes to which the CEP engines are deployed in order to process messages received by the respective nodes before transmitting the processed message to another node, the CEP engines being classified as one of at least two different types of CEP engines, at least one node of the subset of nodes having a first type of CEP engine deployed thereto and at least one other node of the subset of nodes having a second type of CEP engine deployed thereto; and
 for each message, received by a given node, to be forwarded to a further node along one of plural possible paths, the given node is configured to use the processing resources and interface to the network of the given node to route the message to be forwarded to an intermediate node in one of the plural possible paths, the intermediate node being selected from the plurality of computing nodes by the CEP engine of the given node based on metadata associated with the message to be forwarded, wherein at least one of the plurality of computing nodes is dynamically configurable to use one of the brokered communication model and the brokerless communication model based on predicted and/or observed conditions of the network or one or more of the nodes of the plurality of computing nodes.

2. The system of claim 1, wherein routing selections made by the nodes of the plurality of computing nodes are dynamically changeable in response to changing metadata embedded in the message to be forwarded and/or indirectly derived.

3. The system of claim 1, wherein the metadata indicates relative message priority.

4. The system of claim 1, wherein the first type of CEP engine differs from the second type of CEP engine at least in terms of relative processing power.

5. The system of claim 4, wherein lower processing power CEP engines are embedded in the subset of nodes to which the lower processing power CEP engines are deployed.

6. The system of claim 1, wherein message routing decisions are transparent to message generators.

7. The system of claim 6, wherein the message generators are applications that are agnostic as to communication model, transport mechanism, and/or transport protocol.

8. The system of claim 1, wherein the brokered communication model is a publish/subscribe model.

9. The system of claim 8, further comprising at least one broker configured to deliver messages received by the at least one broker to subscribers based on defined datagroups to which the subscribers belong.

10. The system of claim 9, wherein the at least one broker is further configured to deliver the messages received by the at least one broker to the subscribers based on the metadata, which indicates relative message priority.

11. The system of claim 10, wherein a subset of the messages received by the at least one broker that are identified as being non-urgent are routed to a batch processing system for non-real-time processing.

12. The system of claim 9, wherein the subscribers are nodes and/or components of nodes.

13. The system of claim 1, wherein at least some of the nodes of the plurality of computing nodes are geographically dispersed from one another.

14. The system of claim 1, wherein at least some of the nodes of the plurality of computing nodes include hardware sensors.

15. The system of claim 1, wherein the at least one node of the subset of nodes having the first type of CEP engine deployed thereto is configured to send and/or receive messages using the brokered communication model, and the at least one other node of the subset of nodes having the second type of CEP engine deployed thereto is configured to send and/or receive messages using the brokerless communication model, wherein processing power of the first type of CEP engine is higher than processing power of the second type of CEP engine.

16. The system of claim 1, wherein the first type of CEP engine is a standalone CEP engine and the second type of CEP engine is a lightweight and embedded CEP engine, and the at least one node of the subset of nodes having the first type of CEP engine deployed thereto is configured to send and/or receive messages using the brokered communication model, and the at least one other node of the subset of nodes having the second type of CEP engine deployed thereto is configured to send and/or receive messages using the brokerless communication model.

17. The system of claim 1, wherein each node of the subset of nodes is dynamically configurable to have one of the first type of CEP engine deployed thereto and a second type of CEP engine deployed thereto.

18. A computing node in a network comprising different computing nodes, the computing node comprising:
 at least one processor;
 an interface to the network; and
 a complex event processing (CEP) engine configured to, with the aid of the at least one processor, operate on received messages, the CEP engine being classified as one of at least two different types of CEP engines, a first type of CEP engine differing from a second type of CEP engine at least in terms of relative processing power;
 wherein the computing node is dynamically configurable during operation to use one of a brokered communication model and a brokerless communication model to send and/or receive messages over the network via the interface, the computing node being dynamically configurable to use one of the brokered communication model and the brokerless communication model based on predicted and/or observed conditions of the network or one or more of the different computing nodes;
 wherein for each message received by the computing node to be forwarded by the computing node to a further node along one of plural possible paths through the network, the computing node is configured to use the at least one processor and the interface to the network of the computing node to route the message to be forwarded to an intermediate node in one of the plural possible paths, the intermediate node being selected by the CEP engine of the computing node based on metadata associated with the message to be forwarded;

wherein routing selections made by the computing node are dynamically changeable in response to changing metadata; and wherein routing selections are transparent to message generators on the different computing nodes in the network.

19. The computing node of claim 18, wherein the different computing nodes in the network have CEP engines of one of the first and second types deployed thereto and each node is dynamically configurable to send and/or receive messages over the network via interface of the respective node using one of the brokered communication model and the brokerless communication model.

20. The computing node of claim 19, wherein the computing node includes a brokered messaging layer and the CEP engine of the computing node is of the first type.

21. The computing node of claim 20, further comprising a batch processing engine operable in connection with the at least one processor.

22. The computing node of claim 21, further comprising a broker configured to selectively route messages received by the broker to the CEP engine and the batch processing engine.

23. The computing node of claim 19, wherein the computing node includes a brokerless messaging layer and the CEP engine of the computing node is of the second type.

24. The computing node of claim 18, wherein at least some of the nodes of the different computing nodes are geographically dispersed from one another.

25. The computing node of claim 18, wherein the computing node is dynamically configurable, based at least on the metadata associated with the message to be forwarded, to use one of the brokered communication model and the brokerless communication model to send the message to be forwarded.

26. A method of routing messages in a computer system comprising a plurality of computing nodes connected in a network, wherein each said node of the plurality of computing nodes includes processing resources including at least one processor and an interface to the network;

each said node of the plurality of computing nodes is dynamically configurable during operation to use one of a brokered communication model and a brokerless communication model to send and/or receive messages over the network via the respective interface, at least one node of the plurality of computing nodes being configured to send and/or receive messages using the brokered communication model and at least one other node of the plurality of computing nodes being configured to send and/or receive messages using the brokerless communication model;

each node of at least a subset of nodes of the plurality of computing nodes including a complex event processing (CEP) engine deployed thereto, the CEP engines being configured to cooperate with the processing resources of the respective nodes to which the CEP engines are deployed in order to process messages received by the respective nodes before transmitting the processed messages to another node, the CEP engines being classified as one of at least two different types of CEP engines, at least one node in the subset of nodes having a first type of CEP engine deployed thereto and at least one other node in the subset of nodes having a second type of CEP engine deployed thereto; the method comprising:

for each message received by a given node to be forwarded to a further node along one of plural possible paths, using the processing resources and the interface to the network of the given node to route the message to be forwarded to an intermediate node in one of the plural possible paths, the intermediate node being selected from the plurality of computing nodes by the CEP engine of the given node based on metadata associated with the message to be forwarded, wherein at least some of the nodes of the plurality of computing nodes are geographically dispersed from one another and at least one of the plurality of computing nodes is dynamically configurable to use one of the brokered communication model and the brokerless communication model based on predicted and/or observed conditions of the network or one or more of the nodes of the plurality of computing nodes.

27. The method of claim 26, wherein routing selections made by the nodes of the plurality of computing nodes are dynamically changeable in response to changing metadata embedded in the message to be forwarded and/or indirectly derived.

28. The method of claim 26, wherein the brokered communication model is a publish/subscribe model and further comprising:

delivering received messages to subscribers using at least one broker based on defined datagroups to which the subscribers belong and/or the metadata including relative message priority.

29. A non-transitory computer readable storage medium tangibly storing a program including instructions that, when performed on a computing node, perform the method of claim 26.

30. The method of claim 26, wherein the given node is dynamically configurable, based at least on the metadata associated with the message to be forwarded, to use one of the brokered communication model and the brokerless communication model to send the message to be forwarded.

31. The method of claim 26, wherein the given node is dynamically configurable, based at least on the processing resources of other computing nodes connected in the network, to use one of the brokered communication model and the brokerless communication model to send the message to be forwarded.

32. The system of claim 26, wherein the at least one node of the plurality of computing nodes is dynamically configurable to use one of the brokered communication model and the brokerless communication model based on the messages sent and/or received over the network.

33. A method of configuring a computer system for routing messages, the computer system comprising a plurality of computing nodes connected in a network, wherein each said node of the plurality of computing nodes includes processing resources including at least one processor and an interface to the network, the method comprising:

dynamically configuring the nodes of the plurality of computing nodes to use one of a brokered communication model and a brokerless communication model to send and/or receive messages over the network via respective interfaces, at least one node of the plurality of computing nodes being configured to send and/or receive messages using the brokered communication model and at least one other node of the plurality of computing nodes being configured to send and/or receive messages using the brokerless communication model; and deploying, to each node of at least a subset of nodes of the plurality of computing nodes, a complex event processing (CEP) engine, the CEP engines being configured to cooperate with the processing resources of the respective nodes to which the CEP engines are deployed in order to process messages received by the respective nodes before transmitting the processed messages to another node, the CEP engines being classified as one of at least two different types of CEP engines, at least one node of the subset of nodes having a first type of CEP engine deployed thereto and at least one other node of the subset of nodes having a second type of CEP engine deployed thereto, the first type of CEP engine is a lightweight and embedded CEP engine and the second type of CEP engine is a standalone CEP engine having a higher relative processing power than the first type of CEP engine, wherein at least one node with the first type of CEP engine is configured to, using a local rules engine of the first type of CEP engine, directly process the received messages and make brokerless communication model routing decisions, and at least one node with the second type of CEP engine is configured to send and/or receive messages over the network using the brokered communication model, wherein for each message, received by a given node, to be forwarded to a further node along one of plural possible paths, the given node is configured to use the processing resources and interface to the network of the given node to route the message to be forwarded to an intermediate node in one of the plural possible paths, the intermediate node being selected from the plurality of computing nodes by the CEP engine of the given node based on metadata associated with the message to be forwarded, and wherein at least some of the nodes of the plurality of computing nodes are geographically dispersed from one another.

34. The method of claim 33, further comprising dynamically reconfiguring one or more of the nodes of the subset of nodes to use a different communication model and/or a different CEP engine type.

35. The method of claim 34, wherein the reconfiguring is user-initiated.

36. The method of claim 34, wherein the reconfiguring is triggered automatically in response to predicted and/or observed conditions of the network and/or one or more of the nodes of the plurality of computing nodes.

37. A non-transitory computer readable storage medium tangibly storing a program including instructions that, when performed on a computing node, perform the method of claim 33.

* * * * *